United States Patent [19]

Helmling

[11] Patent Number: 5,484,459
[45] Date of Patent: Jan. 16, 1996

[54] MIXTURE OF WATER SOLUBLE REACTIVE DYES AND THEIR USE

[75] Inventor: Walter Helmling, West Warwick, R.I.

[73] Assignee: Hoechst Celanese Corporation, Somerville, N.J.

[21] Appl. No.: 267,639

[22] Filed: Jun. 29, 1994

[51] Int. Cl.[6] .......................... C09B 62/503; C09B 67/24
[52] U.S. Cl. .......................... 8/549; 8/638; 8/641
[58] Field of Search ............................ 8/549, 638, 641

[56] References Cited

U.S. PATENT DOCUMENTS

| | | | |
|---|---|---|---|
| 4,705,524 | 11/1987 | Hahnke et al. | 8/527 |
| 5,047,067 | 9/1991 | Miyazaki et al. | 8/549 |
| 5,352,246 | 10/1994 | Hahnke et al. | 8/638 |

*Primary Examiner*—Margaret Einsmann
*Attorney, Agent, or Firm*—Hugh C. Crall

[57] ABSTRACT

This invention is directed to a dioxazine fiber reactive dye composition which provides brilliant blue shades comparable to those obtained with dyes of the anthraquinone series.

5 Claims, No Drawings

MIXTURE OF WATER SOLUBLE REACTIVE DYES AND THEIR USE

BACKGROUND OF THE INVENTION

1. Technical Field

This invention is directed to reactive dyestuff mixtures for dyeing cellulosic fibers in bright blue colors.

2. Background

Reactive dyes are used either alone or in combination with other reactive dyes which have a different shade or color. In such dye mixtures, it is expected that each dye should give the same fixation or color yield as if the dye is used alone at the same concentration but this is not usually the case. This invention relates to a mixture of water soluble reactive dyes, which exhibit excellent compatibility and no blocking effects; i.e. the dyes when used in admixture do not cause the color yield of the other dyes in the mixture to be reduced.

Anthraquinone based fiber reactive dyes have been the predominant fiber reactive dyes used in the coloring of cotton fabrics in bright blue colors. This dominance of the anthraquinone dyes has been reduced over the past decade by the increasing use of dyes based upon the triphenodioxazine chromophore. Examples of such dyes are described in U.S. Pat. No. 4,629,788 4,577,015 and 4,774,333.

In commercial dyeings, the dioxazine dyes have to be shaded with red, red-violet or violet azo dyes to match the effect or color of the anthraquinone dyes. The number of shading components available to achieve the desired commercial shades are limited and the available shading components have poor compatibility with the dioxazine dyes and exhibit heavy blocking effects. High amounts of the dioxazine blue and the shading component are lost in the dyeing liquor due to compatibility problems and the color yield is low due to blocking effects.

In addition, some of these shading components, especially the violets, contain heavy metals, in particular the copperized dyes. The limited or low fixation yield results in large amounts of heavy metals entering the waste water effluent of the dye plant and this presents environmental issues.

Surprisingly it has been discovered, that a special class of red violet, azo, reactive dyes do not exhibit such blocking effects and these dyes exhibit excellent compatibility with the dioxazine dyes. The dyes also do not contain any heavy metals and are therefore much less of a problem from an environmental standpoint.

SUMMARY OF THE INVENTION

This invention is a vinyl sulfone dye composition comprising at least two dyes; a blue dye and a red violet dye wherein said dyes have the following formulae:

Blue Dioxazine Dye:

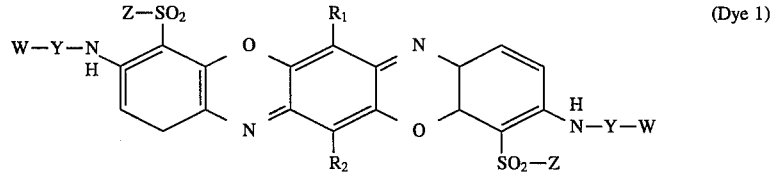
(Dye 1)

wherein:

$R_1$ and $R_2$ are independently selected from H and Cl;

Y is independently selected from $C_2-C_6$ alkylene group which can be interrupted by hetero atoms;

W is independently selected from $-OSO_3H$, $-SO_3H$, $-COOH$;

Z is independently selected from $-CH=CH_2$ or $CH_2-CH_2-X$;

X is a group independently selected from a group, which can be eliminated under alkali conditions; e.g. $-OSO_3H$, $-SSO_3H$, $-OPO_3H_2$ and O-Acyl of the formula $-O-CO-R$ wherein R is a $C_1$ to $C_4$ alkyl; and wherein said second dye has the formula:

Red Violet Dye:

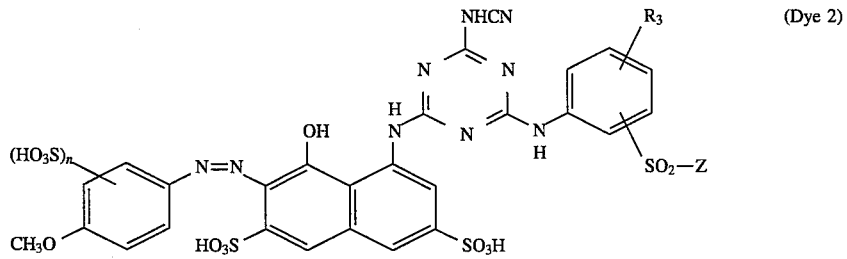
(Dye 2)

n is 0,1,2;

$R_3$ is selected from —H, —$CH_3$, —$OCH_3$;

Z is selected from —CH=$CH_2$ or $CH_2$—$CH_2$—X;

X is a group which can be eliminated under alkali conditions; e.g. —$OSO_3H$, —$SSO_3H$, —$OPO_3H_2$, or an O-Acyl of the formula —O—CO—R— wherein R is a $C_1$ to $C_4$ alkyl.

DESCRIPTION OF THE PREFERRED EMBODIMENTS

This invention is a vinyl sulfone dye composition, selected from dyes of the following formulae:

Blue Dioxazine Dye:

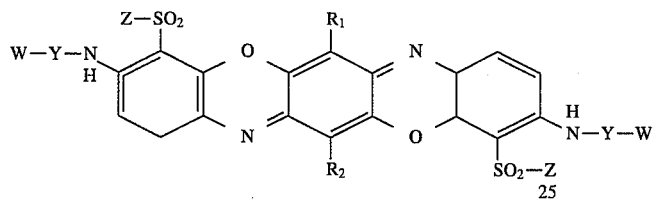

(Dye 1)

wherein:

$R_1$ and $R_2$ are independently selected from H and Cl;

Y is independently selected from $C_2$-$C_6$ alkylene group which can be interrupted by hetero atoms;

W is independently selected from —$OSO_3H$, —$SO_3H$, —COOH;

Z is independently selected from —CH=$CH_2$ or $CH_2$—$CH_2$—X;

X is a group independently selected from group, which can be eliminated under alkali conditions; e.g. —$OSO_3H$, —$SSO_3H$, —$OPO_3H_2$, and O-Acyl such a —O—CO—R wherein R is a $C_1$ to $C_4$ alkyl.

Preferred substituents are:

$R_1$ and $R_2$ are Cl;

Y is —$C_2H_4$—; —$C_2H_4$—NHCO—$CH_2$—$CH_2$—;

W is —$OSO_3H$, —COOH;

Z is β-sulfatoethyl group.

The second dye of the composition has the following formula:

Red Violet Dye:

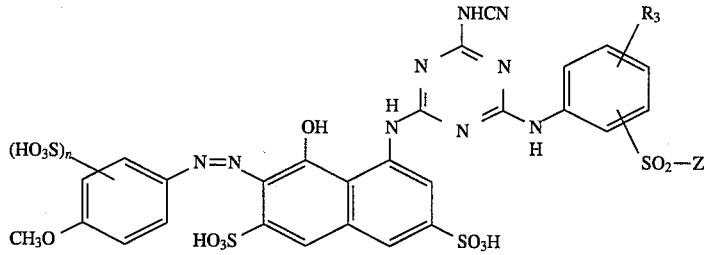

(Dye 2)

n is 0,1,2;

$R_3$ is selected from —H, —$CH_3$, —$OCH_3$;

Z is selected from —CH=$CH_2$ or $CH_2$—$CH_2$—X;

X is a group which can be eliminated under alkali conditions; e.g. —$OSO_3H$, —$SSO_3H$, —$OPO_3H_2$, or an O-Acyl of the formula —O—CO—R— wherein R is a $C_1$ to $C_4$ alkyl.

Preferred substituents are $R_3$ is H; Z is β-sulfatoethyl group and n is 1 or 2.

Dye 1 and Dye 2 may be used in mixtures containing 5–95% by weight of Dye 1 and 95–5% of Dye 2. A preferred ratio is 20–80% by weight of Dye 1 and 80–20% of Dye 2.

The synthesis of the Dye 2 compounds is described in U.S. Pat. No. 5,227,475.

Preferred dyes have the following formula:

Blue Dye 1-1

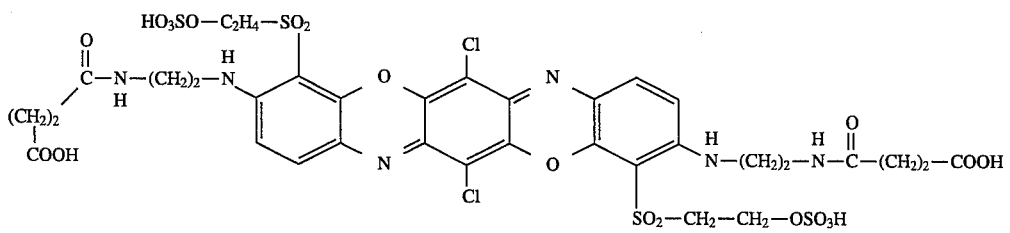

Blue Dye 1-2

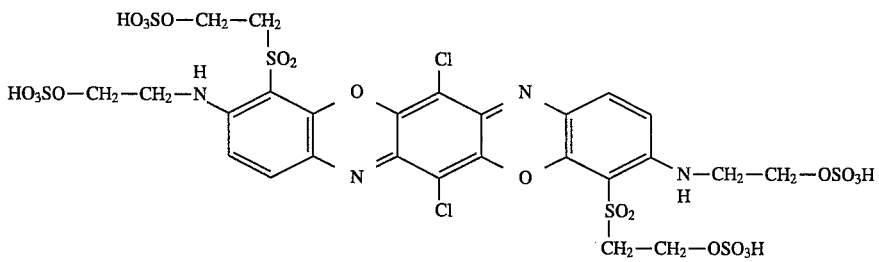

Red Violet Dye 2-1

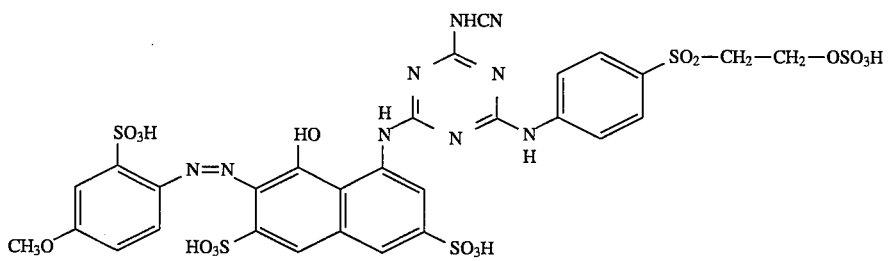

Red Violet Dye 2-2

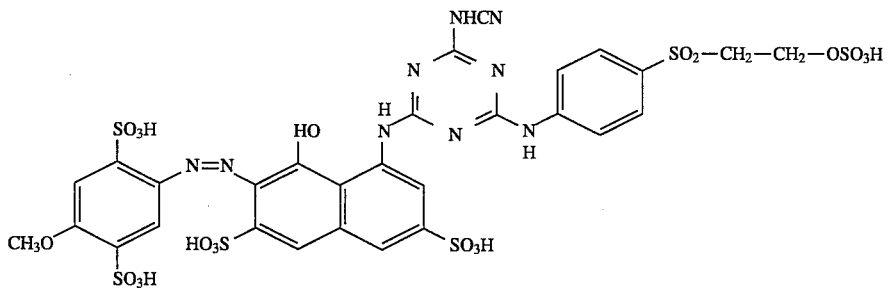

The dye compositions of the invention exhibit very good compatibility and no blocking effects. When these dyes are used in a mixture, they give the same dyeing or color yield and shade as if the dyes are used alone or if one dye is dyed over each other.

The claimed dyestuff mixture can be used to dye cellulosic fibers especially cotton and its blends with other materials e.g. polyester. Conventional dyeing procedures can be used for applying the compositions of the invention; i.e. exhaust, continuous or printing methods well known in the art. A preferred application method is the exhaust dyeing at 40°–60° C.

The dyes used in the invention can be used in the free sulfonic acid form or as the metal salts thereof; preferably as salts. Suitable salts are the alkali metal, alkaline earth-metal or ammonium salts, or as a salt of triethanolamine. The dye compositions of the invention can be used in the form of an aqueous solution or a powder and they can be used in combination with further additives, such as sodium chloride, sodium sulfate organic anionic dispersing agents, dedusting agents, leveling agents etc.

EXAMPLE 1

A 20 g piece of bleached knit cotton good is dyed in an aqueous dye bath containing:

1% owg Blue Dye 1-1 (weight of good)

1% owg Red Violet Dye 2-1

25% owg common salt

5% owg soda ash

The dyeing is conducted at a liquor ratio 1:10. The temperature of the dyeing bath was set at 30° C. and then raised at a rate of 1 ° C. per minute until it reached 60° C. The dye bath was held at 60° C. for 45 minutes and the bath was dropped. The dyed fabric was rinsed at 50° C., twice at 60° C., once at 95° C. and finally at 60° C. and 40° C. The dyeing is a deep, brilliant, bluish violet with excellent fastness properties.

Blocking effects were determined by the following procedure. A special dyeing was prepared and used as standard. This standard was made by first dyeing the fabric with the Blue Dye 1-1 and then the resulted blue dyed fabric was overdyed with the Red Violet Dye 2-1. The same dyeing conditions and dye concentrations were used for the mixture.

The overdyeing process shows whether any blocking effects between the dyes occurred. Block effects are normally caused by interactions between the dye molecules in the aqueous dyeing liquor. The dyeing yield (based on color density units) of this overdyed fabric was measured and compared to a dyeing made with the dye mixtures.

Red II Dye:

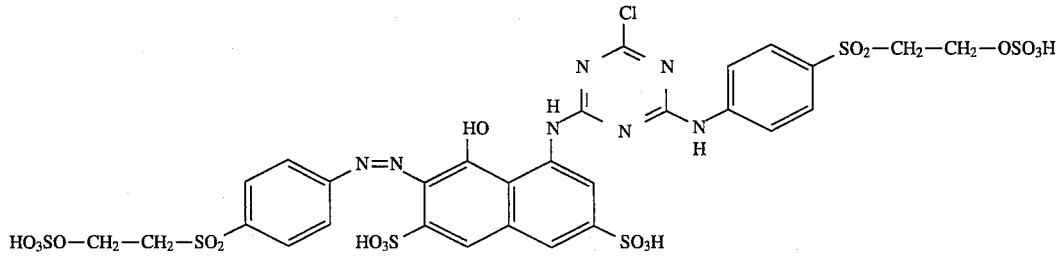

It was found, that 92% of the dyeing yield was achieved by using the mixture. Also the dyeing made with the mixture shows the same shade as the overdyed fabric. Therefore, the dye mixture did not show any blocking effects.

Table 1 shows the dyeing yield of different ratios of Blue 1-1 and Red Violet 2-1 in comparison to the overdyed sample.

TABLE 1

| Blue Dye 1-1 | 1.8% | 1.6% | 1.4% | 1.2% |
|---|---|---|---|---|
| Red Dye 2-1 | 0.2% | 0.4% | 0.6% | 0.8% |
| Dyeing Yield* | 97% | 95% | 96% | 92% |

*percent dyeing yield based on overdyed standard

None of the experiments showed any blocking effects.

A comparison of these results to the state of the art was made. The same experiments were run using a dye designated Red I Dye, which is commercially available. This Red I Dye is disclosed in U.S. Pat. No. 3,223,470.

Again, different ratios of the dyes were dyed and compared to the dyeing yield of the overdyed standard. Table 2 summarizes the results of these experiments.

TABLE 2

| Blue Dye 1-1 | 1.8% | 1.6% | 1.4% | 1.2% | 1.0% |
|---|---|---|---|---|---|
| Red I Dye | 0.2% | 0.4% | 0.6% | 0.8% | 1.0% |
| Dyeing Yield* | 89% | 75% | 66% | 59% | 56% |

*percent dyeing yield based on overdyed standard

As shown in Table 2, heavy blocking effects were observed.

A second comparison of the invention to another prior art mixture was made. A different red, Red II Dye was used. This Red II Dye is disclosed in the EP Patent 094055.

Again different ratios of Blue 1-1 and Red II dyes were dyed and compared to the dyeing yield of the overdyed standard. Table 3 summarizes the results of these experiments.

TABLE 3

| Blue Dye 1-1 | 1.8% | 1.6% | 1.4% | 1.2% | 1.0% |
|---|---|---|---|---|---|
| Red II Dye | 0.2% | 0.4% | 0.6% | 0.8% | 1.0% |
| Dyeing Yield* | 87% | 77% | 74% | 68% | 64% |

*percent dyeing yield based on overdyed standard

As shown in the above Table 3, heavy blocking effects were observed.

EXAMPLE 2

A 20 g piece of bleached knit cotton good is dyed in an aqueous dye bath containing:

1% owg Blue Dye 1-2 (weight of good)

Red I Dye:

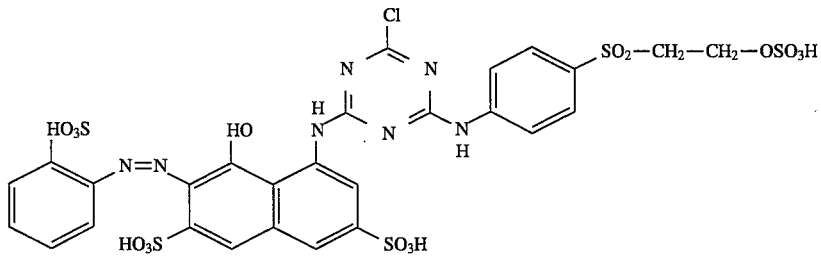

1% owg Red Violet Dye 2-1

25% owg common salt

5% owg soda ash

The dyeing was conducted at a liquor ratio of 1:10. The temperature of the dyeing bath was set at 30° C. and then raised at a rate of 1 ° C. per minute until it reached 60° C. After holding the dye bath at 60° C. for 45 minutes, the bath was dropped. The dyed fabric was rinsed at 50° C., twice at 60° C., once at 95° C. and finally at 60° C. and 40° C. The dyeing is a deep brilliant bluish violet with excellent fastness properties.

The same overdyeing procedure as described above was used to compare these dyes with the standard and the prior art. It was found, that 90% of the dyeing yield was achieved by using the mixture. Also the dyeing made with the mixture shows the same shade as the overdyed fabric. Therefore the dyeing mixture does not show any blocking effects.

Table 4 shows the dyeing yield of different ratios of Blue Dye 1-2 and Red Violet Dye 2-1 in comparison to the overdyed sample.

TABLE 4

| Blue Dye 1-2 | 1.8% | 1.6% | 1.4% | 1.2% |
| Red Violet Dye 2-1 | 0.2% | 0.4% | 0.6% | 0.8% |
| Dyeing Yield* | 100% | 98% | 94% | 94% |

*percent dyeing yield based on overdyed standard

None of the experiments showed any blocking effects.

To compare these results of composition of the invention to the state of the art, the same experiments were run, by using Red I Dye. Again, different ratios of the dyes were dyed and compared to the dyeing yield of the overdyed samples. Table 5 contains the results of these experiments.

TABLE 5

| Blue Dye 1-2 | 1.8% | 1.6% | 1.4% | 1.2% | 1.0% |
| Red I Dye | 0.2% | 0.4% | 0.6% | 0.8% | 1.0% |
| Dyeing Yield* | 91% | 73% | 69% | 60% | 57% |

As shown in Table 5 heavy blocking effects were observed.

Red II Dye was also used in a mixture with Blue Dye 1-2. Again different ratios of Blue Dye 1-2 and Red II Dye were dyed and compared to the dyeing yield of the overdyed samples. Table 6 contains the results of this experiment.

TABLE 6

| Blue Dye 1-2 | 1.8% | 1.6% | 1.4% | 1.2% | 1.0% |
| Red I Dye | 0.2% | 0.4% | 0.6% | 0.8% | 1.0% |
| Dyeing Yield* | 96% | 84% | 75% | 70% | 65% |

*percent dyeing yield based on overdyed standard

As shown in the above Table 6, heavy blocking effects were observed and a high dye loss occurred in the dyeing liquor.

We claim:

1. A dye mixture consisting essentially of at least one blue dye, in an amount of about 5 to 95 weight percent, of the formula:

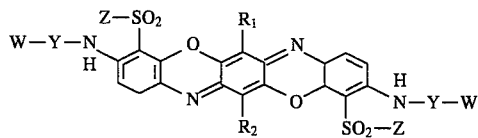

wherein:

$R_1$ and $R_2$ are independently selected from H and Cl;

Y is independently selected from a $C_2$-$C_6$ alkylene group which may be interrupted by a hetero atom and the —NHCO— group;

W is independently selected from —$OSO_3H$, —$SO_3H$, and —COOH;

Z is independently selected from —CH=$CH_2$ and $CH_2$—$CH_2$—X;

X is a group independently selected from —$OSO_3H$, —$SSO_3H$, —$OPO_3H_2$ and an O-Acyl of the formula —O—CO—R wherein R is a $C_1$ to $C_4$ alkyl; and at least one red dye, in an amount from about 95 to about 5 percent by weight, of the formula:

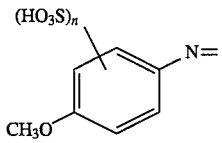

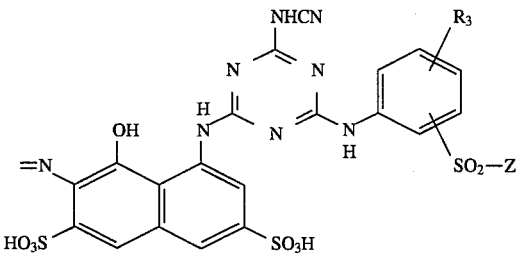

wherein:

n is 0, 1, 2;

$R_3$ is selected from —H, —$CH_3$, —$OCH_3$;

Z is selected from —CH=$CH_2$ or $CH_2$—$CH_2$—X;

X is selected from —$OSO_3H$, —$SSO_3H$, —$OPO_3H_2$, and an O-Acyl of the formula —O—CO—R— wherein R is a $C_1$ to $C_4$ alkyl.

2. A dye composition according to claim 1 wherein:

$R_1$ and $R_2$ are Cl;

Y is independently selected from —$C_2H_4$— and —$C_2H_4$—NHCO$C_2H_4$—;

W is independently selected from —$OSO_3H$ and —COOH;

$R_3$ is hydrogen; n is 1 or 2; and

Z is the β-sulfatoethyl sulfone group.

3. A dye composition according to claim 1 wherein said blue dyes are selected from dyes of the following formula:

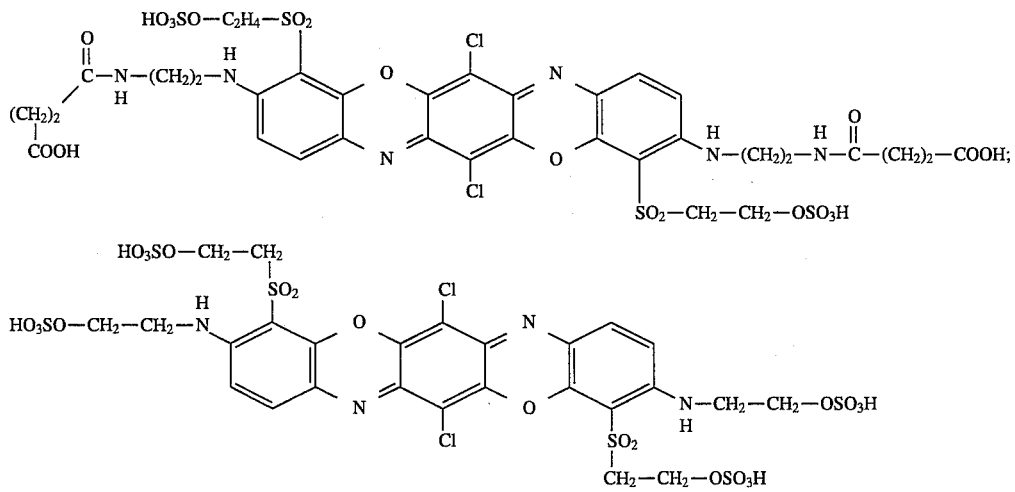
and wherein said red dyes are selected from dyes of the formula:
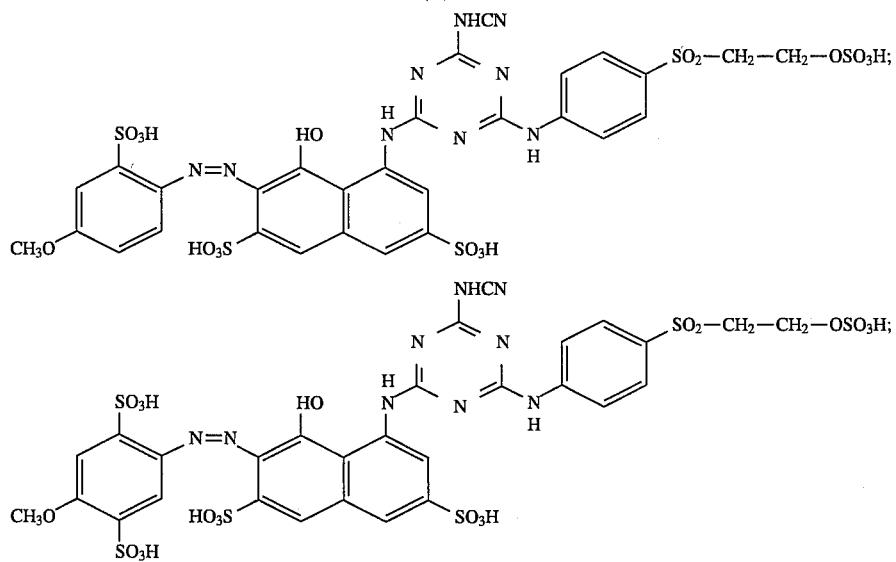
and mixtures thereof.
4. A dye composition according to claim 3 wherein said blue dye is present in an amount from about 80 to 20 weight percent and said red dye is present in an amount of from about 20 to 80 weight percent.
5. A composition according to claim 3 wherein said composition is in aqueous solution.
* * * * *